United States Patent
Komori et al.

(10) Patent No.: US 8,362,749 B2
(45) Date of Patent: Jan. 29, 2013

(54) METHOD FOR EXCHANGING RECHARGEABLE BATTERIES

(75) Inventors: Katsunori Komori, Toyohashi (JP);
Naoto Sato, Kosai (JP)

(73) Assignee: Panasonic EV Energy Co., Ltd.,
Kosai-Shi, Shizuoka (JP)

( * ) Notice: Subject to any disclaimer, the term of this patent is extended or adjusted under 35 U.S.C. 154(b) by 378 days.

(21) Appl. No.: 12/466,162

(22) Filed: May 14, 2009

(65) Prior Publication Data

US 2009/0284226 A1    Nov. 19, 2009

(30) Foreign Application Priority Data

May 19, 2008    (JP) ................................. 2008-130723

(51) Int. Cl.
*H02J 7/00* (2006.01)
(52) U.S. Cl. ........................................................ 320/136
(58) Field of Classification Search .................. 320/135, 320/136; 429/49
See application file for complete search history.

(56) References Cited

U.S. PATENT DOCUMENTS

| | | | | |
|---|---|---|---|---|
| 3,781,175 | A  * | 12/1973 | Kinsey ............................... | 429/95 |
| 3,997,830 | A  * | 12/1976 | Newell et al. .................. | 320/102 |
| 6,573,685 | B2 | 6/2003 | Nakanishi | |
| 6,936,371 | B2 * | 8/2005 | Komori et al. ................... | 429/49 |
| 6,940,254 | B2 | 9/2005 | Nagamine et al. | |
| 7,038,426 | B2 * | 5/2006 | Hall ............... | 320/135 |
| 7,573,230 | B2 * | 8/2009 | Dickson et al. ............... | 320/107 |
| 7,998,609 | B2 | 8/2011 | Takada et al. | |
| 2003/0120380 | A1* | 6/2003 | Bean .............................. | 700/231 |
| 2003/0224241 | A1 | 12/2003 | Takada et al. | |
| 2007/0134546 | A1* | 6/2007 | Hashimoto ..................... | 429/49 |

FOREIGN PATENT DOCUMENTS

| | | |
|---|---|---|
| JP | 07-203634 | 8/1995 |
| JP | 2002-015781 | 1/2002 |
| JP | 2003-346909 | 12/2003 |
| JP | 2004-158264 | 6/2004 |
| JP | 2004-185915 | 7/2004 |
| JP | 3820184 | 9/2006 |
| JP | 2008-047475 | 2/2008 |

OTHER PUBLICATIONS

Battery Information V1.00, downloaded Jan. 9, 2012 and available Aug. 28, 2005 at http://www.repairfaq.org/ELE/F_Battery_info.html.*

* cited by examiner

*Primary Examiner* — Melissa Koval
*Assistant Examiner* — Daniel Miller
(74) *Attorney, Agent, or Firm* — Workman Nydegger

(57) ABSTRACT

A rechargeable battery exchanging method which exchanges rechargeable batteries of an assembled battery to rebuild new assembled battery. The method includes discharging a rechargeable battery derived from an assembled battery until the rechargeable battery becomes a fully discharged state and storing the rechargeable battery in a storage region for a predetermined period of time or longer from when the rechargeable battery becomes the fully discharged state to prepare a reusable rechargeable battery. The method further includes rebuilding a regenerated assembled battery by combining the stored reusable rechargeable battery with a stored reusable rechargeable battery derived from other assembled batteries or combining the stored reusable rechargeable battery with a fresh rechargeable battery.

7 Claims, 6 Drawing Sheets

METHOD FOR EXCHANGING RECHARGEABLE BATTERIES

CROSS-REFERENCE TO RELATED APPLICATIONS

This application is based upon and claims the benefit of priority from prior Japanese Patent Application No. 2008-130723, filed on May 19, 2008, the entire contents of which are incorporated herein by reference.

BACKGROUND OF THE INVENTION

The present invention relates to a method for exchanging rechargeable batteries to rebuild an assembled battery, which includes a plurality of rechargeable batteries that accumulate memory effect, by exchanging rechargeable batteries that have become defective with replacement rechargeable batteries.

In electric vehicles, hybrid vehicles, and the like, an assembled battery including a plurality of rechargeable batteries is used as a power source. In such an assembled battery, due to differences between rechargeable batteries or defective parts used in a rechargeable battery, some of the rechargeable batteries in an assembled battery may have a shorter life than the other rechargeable batteries. When such a problem occurs, the capacity of the assembled battery cannot be used to full extent. This may cause an anomaly in a system that uses the assembled battery. If the entire assembled battery were to be exchanged with a new one, the rechargeable batteries that are not defective would be wasted. Accordingly, studies have been conducted to rebuild an assembled battery by exchanging only defective rechargeable batteries with normally functioning rechargeable batteries and reusing the other rechargeable batteries that do not have to be replaced.

A rechargeable battery typically used in an electric vehicle or a hybrid vehicle may be a nickel cadmium (NiCd) or nickel metal hydride (NiMH) rechargeable battery. Such types of rechargeable batteries are susceptible to the so-called memory effect. Memory effect causes a difference in the characteristics of the rechargeable battery between initial use and after use over a certain period. As the use of the rechargeable battery continues, the accumulated memory effect increases. The accumulation of the memory effect is dependent on the usage environment and usage conditions and thus differs between users. Thus, conformance with such used rechargeable batteries (i.e., non-exchanged rechargeable batteries) must be considered when rebuilding an assembled battery. Otherwise, the rebuilt assembled battery may have insufficient capacity.

Japanese Laid-Open Patent Publication No. 2004-185915 and Japanese Patent No. 3820184 describe examples of solutions to such technical problems.

The '915 publication suggests a rechargeable battery exchanging method that charges replacement rechargeable batteries to a state of charge (SOC) of which level is lower than the SOC of non-exchanged rechargeable batteries and then exchanges the replacement rechargeable batteries with originally installed rechargeable batteries. In an assembled battery that is rebuilt in this manner, by repeating charging and discharging, the difference in SOC between the newly installed replacement rechargeable batteries and the non-exchanged rechargeable batteries becomes small. Consequently, the SOC becomes the same in all of the rechargeable batteries forming the assembled battery. Thus, as described in the '915 publication, the capacity of the assembled battery may be used to full extent.

The '184 patent suggests a rechargeable battery exchanging method that uses replacement rechargeable batteries subjected to memory effect at a level that is about the same as the memory effect accumulated in the non-exchanged rechargeable batteries. In an assembled battery that is rebuilt in this manner, the voltage characteristics of the replacement rechargeable batteries become the same as the non-exchanged rechargeable batteries. Thus, as described in the '184 patent, the capacity of the assembled battery may be used to full extent.

SUMMARY OF THE INVENTION

However, to rebuild an assembled battery having sufficient capacity with the method of the '915 publication, the SOC must be checked for every one of the rechargeable batteries in the assembled battery. Furthermore, the SOC of the non-exchanged rechargeable batteries and the replacement rechargeable batteries must be adjusted. As a result, the method of the '915 publication is burdensome.

In the method of the '184 patent, the memory effect must be checked for every one of the rechargeable batteries in the assembled battery. Furthermore, the replacement rechargeable batteries must accumulate memory effect that is about the same as the memory effect accumulated in the non-exchanged batteries. As a result, the method of the '184 patent is burdensome.

The burdensome tasks of the prior art methods become obstacles when rebuilding an assembled battery.

It is an object of the present invention to provide a rechargeable battery exchanging method that allows for an assembled battery having sufficient capacity to be easily rebuilt.

One aspect of the present invention is a rechargeable battery exchanging method including discharging a rechargeable battery derived from an assembled battery until the rechargeable battery becomes a fully discharged state, storing the rechargeable battery in a storage region for a predetermined period of time or longer from when the rechargeable battery becomes a fully discharged state to prepare a reusable rechargeable battery, and rebuilding a regenerated assembled battery by combining the stored reusable rechargeable battery derived from the assembled battery with a stored reusable rechargeable battery derived from other assembled batteries or combining the stored reusable rechargeable battery derived from the assembled battery with a fresh rechargeable battery.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
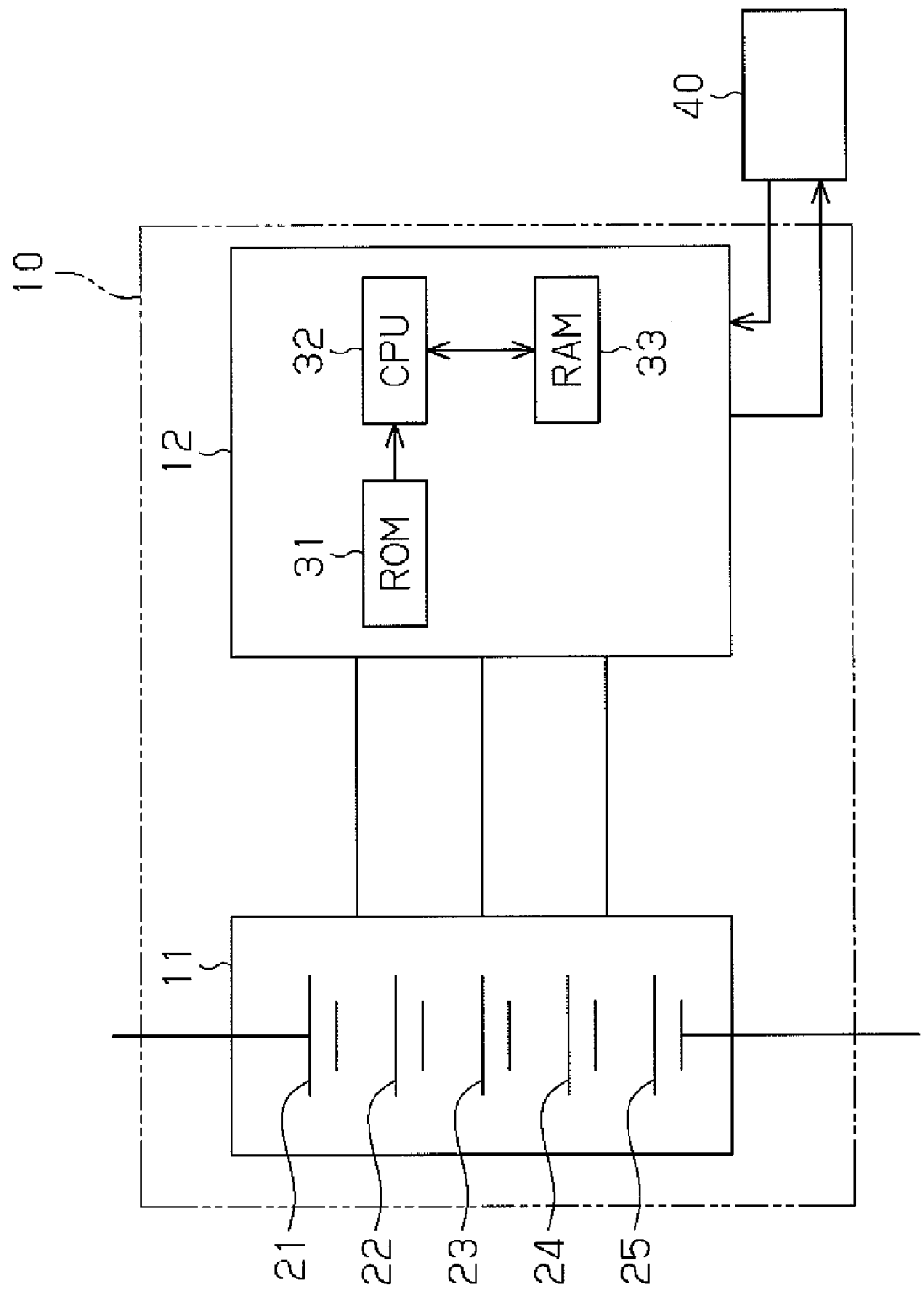
FIG. 1 is a block diagram of a controller-equipped assembled battery according to a preferred embodiment of the present invention.
Figure 2:
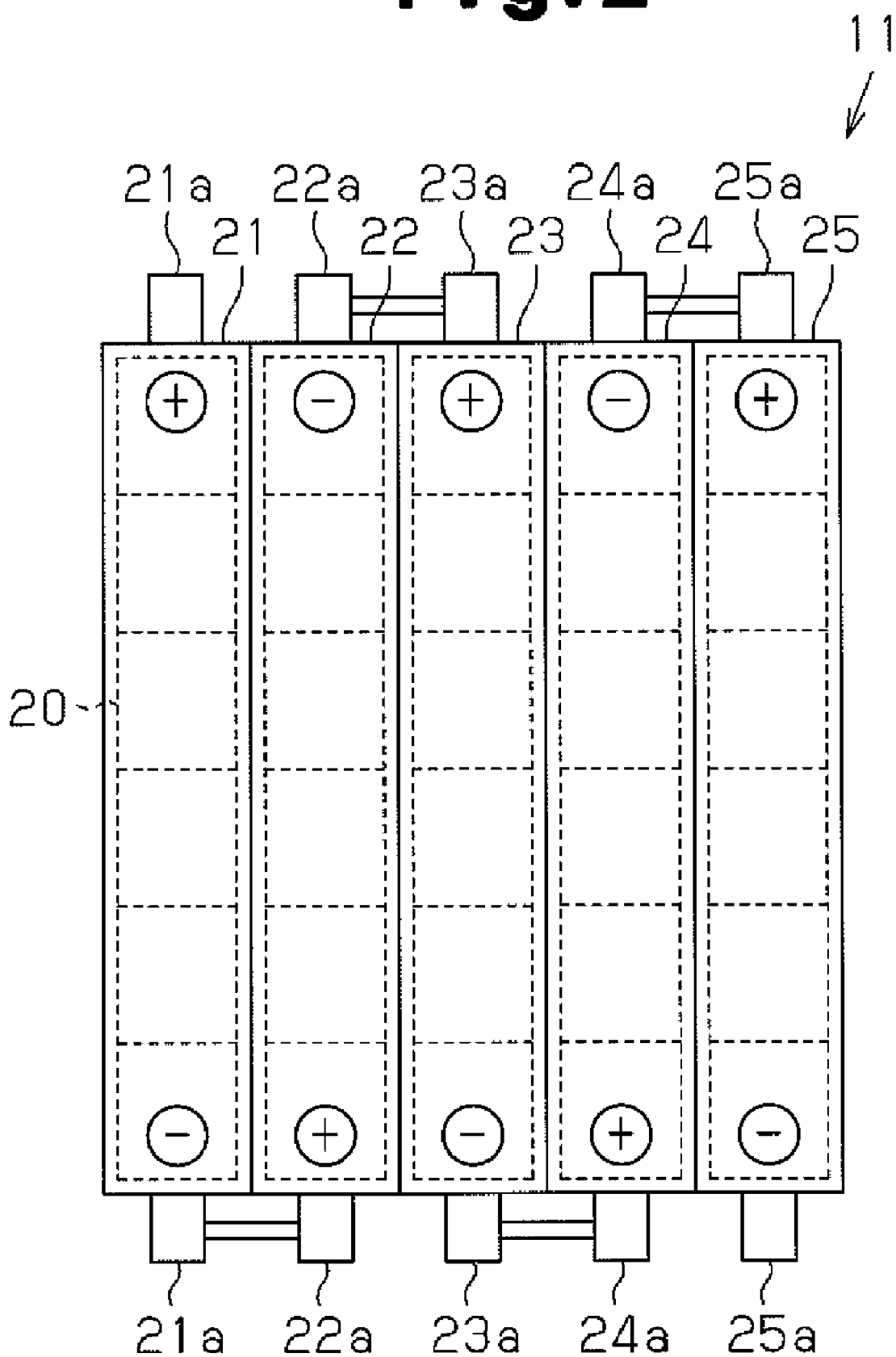
FIG. 2 is a schematic diagram of an assembled battery main body.

Referring to FIG. 1, a controller-equipped assembled battery 10, which is installed in a vehicle such as an electric vehicle and a hybrid vehicle, includes an assembled battery main body 11 and a battery controller 12. Referring to FIG. 2, the assembled battery main body 11 includes five series-connected battery modules 21 to 25. The battery modules 21 to 25 each include six rechargeable batteries 20 (six cells). In a non-limiting example, each of the rechargeable batteries 20 is a nickel metal hydride (NiMH) rechargeable battery. As shown in FIG. 1, the battery controller 12 includes a ROM 31, a CPU 32, and a RAM 33. Under the control of a vehicle controller unit 40, the battery controller 12 controls the charging and discharging of the assembled battery main body 11. The battery controller 12 estimates the state of charge (SOC) and determines anomalies in each battery module based on detection signals of the battery voltage for each of the battery modules 21 to 25.

Figure 3:
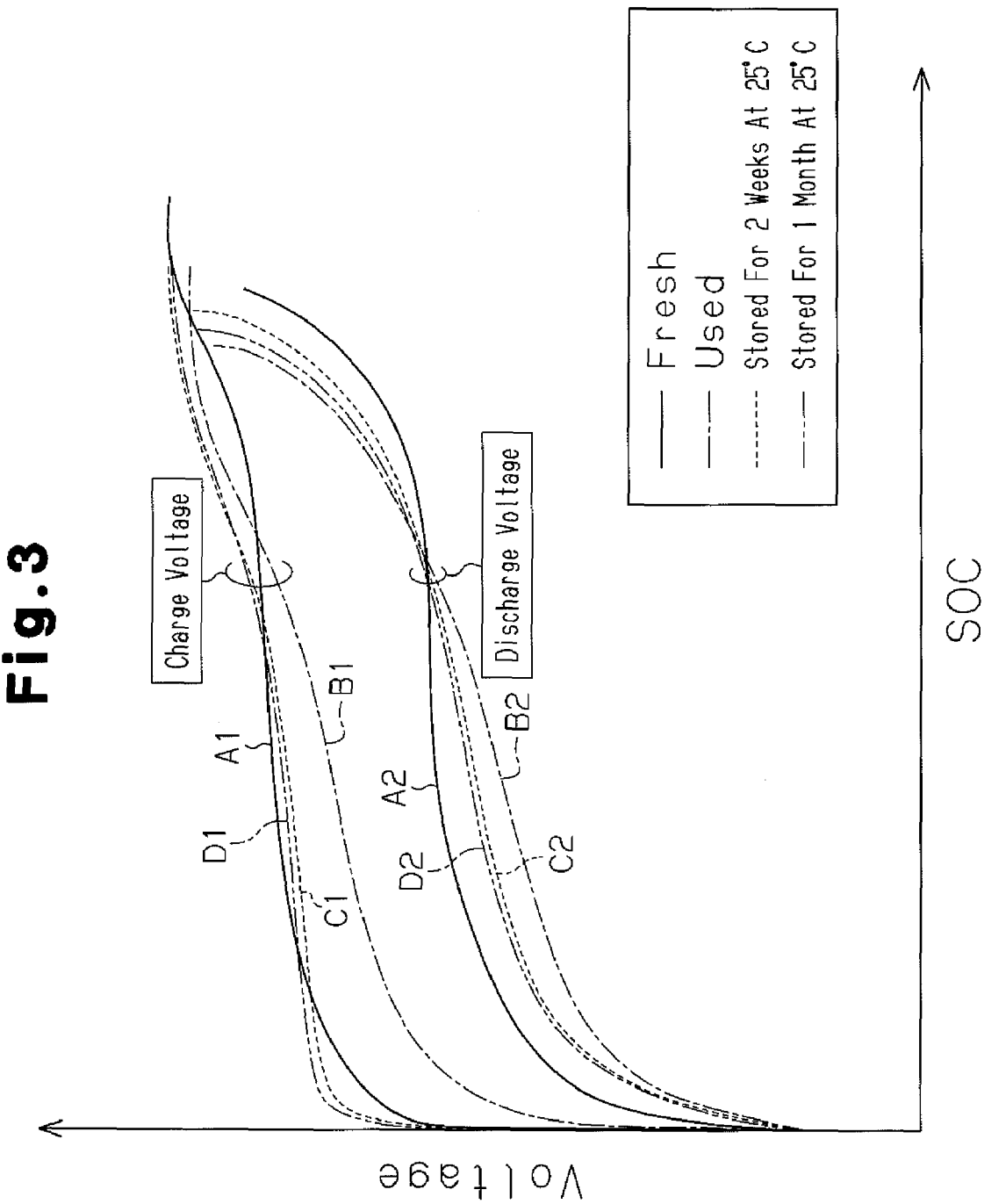
FIGS. 3 to 5 are graphs showing the voltage characteristics of the rechargeable battery in which the horizontal axis represents SOC and the vertical axis represents voltage.
Figure 4:
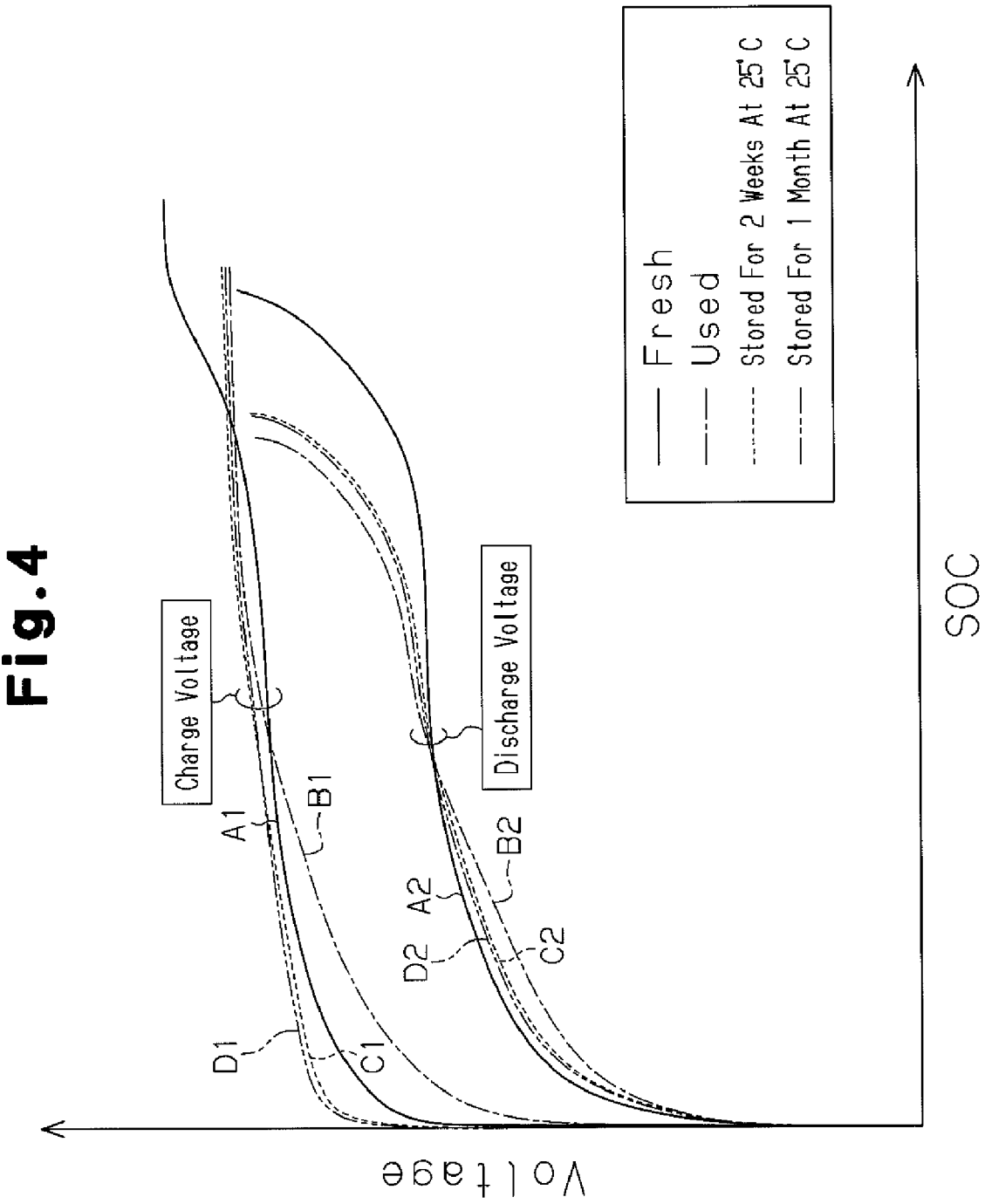

In FIGS. 3 and 4, the solid lines represent charge and discharge voltage curves of the rechargeable batteries 20 in a fresh state. The single-dotted lines represent charge and discharge voltage curves of the rechargeable batteries 20 in a used state in which charging and discharging have been repeated for a certain number of times. The charge and discharge voltage curves are varied when the rechargeable batteries 20 are repeatedly charged and discharged.

FIG. 3 will now be discussed in detail.

Characteristic curve A1 shows the charge voltage for a rechargeable battery 20, which is in a fresh state and has been discharged until the SOC becomes 0%. In this case, the charging of the rechargeable battery 20 is started as soon as the discharging is completed (zero hold time). It is apparent from characteristic curve A1 that the charge voltage rapidly increases as the SOC increases from zero. Further, after the charge voltage rises, the charge voltage stabilizes in a generally horizontal state and increases in a gradual manner as the SOC increases.

Characteristic curve B1 shows the charge voltage for a used rechargeable battery 20 charged in the same manner as described above. It is apparent from characteristic curve B1 that as the SOC increases from zero, the charge voltage gradually increases at a level lower than the characteristic curve A1, which shows the charge voltage for the fresh state. Further, after the charge voltage rises, the charge voltage increases at a relatively large inclination as the SOC increases and subsequently becomes greater than the characteristic curve A1.

Characteristic curve A2 shows the discharge voltage for the rechargeable battery 20, which is in the fresh state, when charged as described above and then discharged. It is apparent from characteristic curve A2 that the discharge voltage drastically decreases as soon as discharging starts from a full state of charge, or full SOC. Further, after the discharge voltage falls, the discharge voltage stabilizes in a generally horizontal state and decreases in a gradual manner as the SOC decreases. Subsequently, the discharge voltage drastically decreases when the SOC becomes close to zero.

Characteristic curve B2 shows the discharge voltage for the used rechargeable battery 20 discharged in the manner described above. It is apparent from characteristic curve B2 that the full SOC level is less than the full SOC level of shown in characteristic curve A2. The discharge voltage decreases in a somewhat gradual manner from the full SOC level. After the discharge voltage falls, the discharge voltage decreases at a relatively large inclination as the SOC decreases. When reaching a generally halfway point of the SOC, the characteristic curve B2 extends across the characteristic curve A2 and decreases as it deviates for a significant amount in a downward direction from the characteristic curve A2 until the SOC becomes zero.

FIG. 4 will now be discussed in detail. For FIG. 4, a used rechargeable battery 20 of which usage environment and usage conditions differ from that of FIG. 3 is employed. Characteristic curve B1 shows the charge voltage and characteristic curve B2 shows the discharge voltage of the rechargeable battery when performing charging and discharging in the same manner as in FIG. 3. In FIG. 4, characteristic curves A1 and A2 for the fresh state are the same as in FIG. 3. The shapes of characteristic curves B1 and B2 for the used state slightly differs between FIGS. 4 and 3. However, a varying tendency for the curves B1 and B2 in FIG. 4 with respect to the curves A1 and A2 is the same as the curves B1 and B2 in FIG. 3 with respect to the curves A1 and A2.

Memory effect accumulates when charging and discharging is repeated from a fresh state. Thus, as apparent from FIGS. 3 and 4, the charge and discharge voltages for the rechargeable battery 20 in a fresh state shown by characteristic curves A1 and A2 varies to the charge and discharge voltages for the rechargeable battery 20 in a used state shown by characteristic curves B1 and B2.

The inventors of the present invention have measured the characteristics of the charge and discharge voltages for a used rechargeable battery 20, in which memory effect was accumulated. The used rechargeable battery 20, the characteristics of which was in correspondence with the characteristic curves B1 and B2, was fully discharged until the SOC became 0% to 5%. Then, the fully discharged used rechargeable battery 20 was left (stored) in a storage region over a certain storage period at a certain temperature (e.g., 25° C.). After the storage, the characteristics of the charge and discharge voltages for the used rechargeable battery 20 were measured. The results are shown by curves C1, C2, D1, and D2 in FIGS. 3 and 4.

In FIGS. 3 and 4, characteristic curve C1 (the dash lines in FIGS. 3 and 4) shows the charge voltage for a used rechargeable battery stored for two weeks. Characteristic curve D1 (the chain double-dashed lines in FIGS. 3 and 4) shows the charge voltage for a used rechargeable battery stored for one month. In comparison with characteristic curve B1 showing the charge voltage for a used rechargeable battery that was not stored, the deviation from characteristic curve A1, which shows the charge voltage for the fresh state, was smaller in characteristic curves C1 and D1. Thus, it is apparent that characteristic curves C1 and D1 are closer to characteristic curve A1.

In the same manner, characteristic curve C2 (the dash lines in FIGS. 3 and 4) shows the discharge voltage for a used rechargeable battery stored for two weeks. Characteristic curve D2 (the chain double-dashed lines in FIGS. 3 and 4) shows the discharge voltage for a used rechargeable battery stored for one month. In comparison with characteristic curve B2 showing the discharge voltage for a used rechargeable battery that was not stored, the deviation from characteristic curve A2, which shows the discharge voltage for the fresh state, was smaller in characteristic curves C2 and D2. Thus, it is apparent that characteristic curves C2 and D2 are closer to characteristic curve A2.

In other words, by fully discharging a used rechargeable battery and then storing the used rechargeable battery for a certain storage period or longer, memory effect, which results from charging and discharging and accumulates in the used rechargeable battery, is significantly decreased. This improves the battery characteristics.

Figure 5:
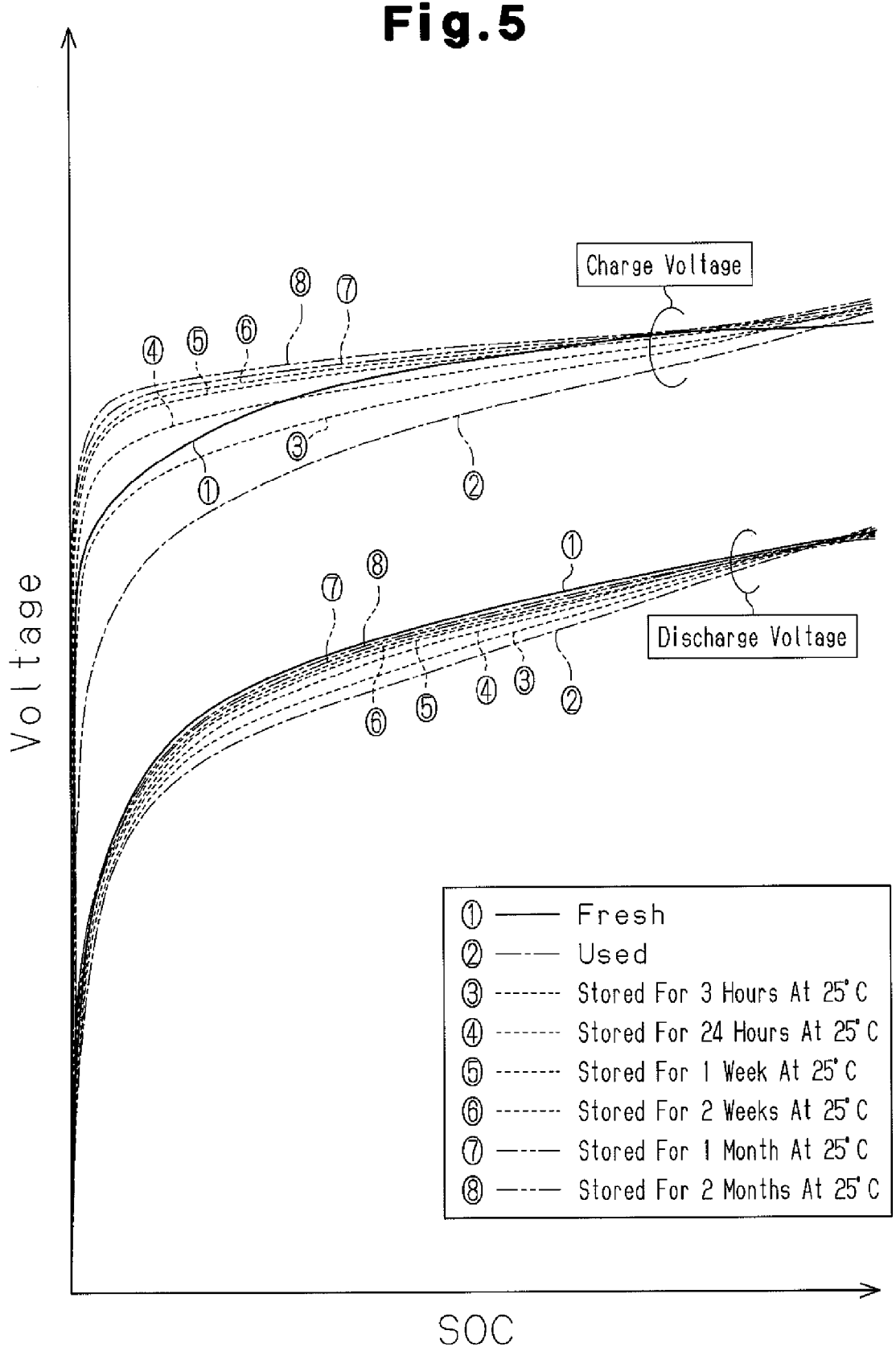

The charge and discharge voltage characteristics of a rechargeable battery were measured for various storage periods, such as two weeks, one month, three hours, twenty-four hours, one week, and two months. The results are shown in FIG. 5. FIG. 5 shows only a low range in which the SOC is close to zero. The storage period becomes longer in the order of curves 3 to 8. The characteristic curves of the charge and discharge voltages are improved in the order of storage for three hours, twenty-four hours, one week, a, and two months. The width of characteristic improvement was relatively large especially for three hours, twenty-four hours, and one week. However, the width of characteristic improvement decreased when the storage period exceeded one week. Thus, a large improving effect cannot be obtained when the storage period is long.

In the illustrated example, the rechargeable battery 20, which is used under ambient temperatures, is stored under a temperature of 25° C. However, it may be assumed that sufficient effects may be obtained by storing the rechargeable battery 20 of the preferred embodiment under ambient temperatures. A storage environment satisfying predetermined conditions for storing a rechargeable battery to improve the battery characteristics may be referred to as a "storage region."

Figure 6:
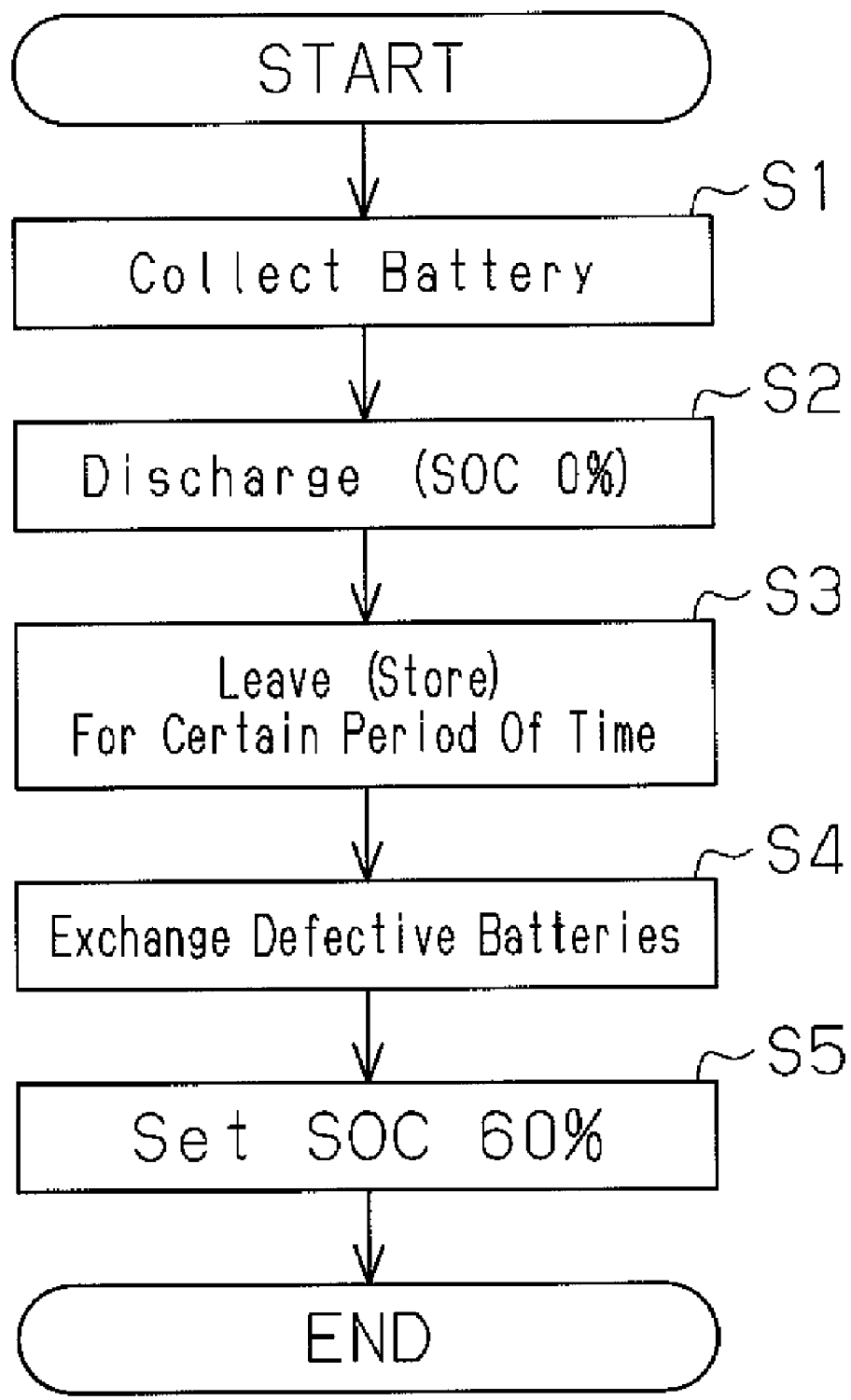
FIG. 6 is a flowchart showing the procedures for rebuilding an assembled battery.

Based on the results described above, the inventors of the present invention have studied how to rebuild an assembled battery 10 with sufficient capacity. The procedures are shown in FIG. 6. Here, a defective assembled battery 10, in which some of the rechargeable batteries 20 have drained at an early stage or have a defect due to one reason or another, is collected from a user. The problems of the assembled battery are solved. Then, the assembled battery 10 is rebuilt and returned to the user.

Step S1: An assembled battery 10, in which some of the rechargeable batteries 20 have a defect due to one reason or another, is collected from a user. The collected assembled battery 10 may include rechargeable batteries (reusable rechargeable batteries) that can be used to rebuild the assembled battery 10 or another assembled battery.

Step S2 (Discharge): Each of the rechargeable batteries 20 (including the defective rechargeable batteries) in the collected assembled battery 10 is fully discharged. In one example, a fully discharged state is determined when the SOC becomes 0% to 5%. The discharging includes electrically disconnecting the battery modules 21 to 25 of the assembled battery 10 and discharging each of the battery modules 21 to 25. The process for completely discharging the battery modules 21 to 25 may include detecting or monitoring the discharge voltage. Through the detection or monitoring, among the battery modules 21 to 25, those having a defect in the low SOC range may be newly found.

It is preferable that the battery modules 21 to 25 each be wholly discharged for at least two reasons. The first reason is in that the connection terminals (not shown) of each rechargeable battery 20 is hidden in the corresponding module, while connection terminals 21a to 25a of the modules 21 to 25 are either exposed or easily exposable to the exterior. Thus, in comparison with when discharging each of the rechargeable batteries 20, a discharge device (not shown) can be connected more easily. The second reason is in that excessive discharging of a defective battery that would occur when entirely discharging the assembled battery 10 can be avoided.

Step S3 (Storage): The fully discharged battery modules 21 to 25 are stored (left) for a certain time or longer in a storage region under ambient temperatures. The storage time may be set to mainly reduce the memory effect accumulation or balance the reduction of the memory effect accumulation with storage costs. The storing (leaving) of the battery modules 21 to 25 may include detecting or monitoring changes in the battery voltage of the battery modules. Through the detection or monitoring, further battery modules having a defect may be newly found.

A battery module including rechargeable batteries that have been stored for a predetermined period after full discharging becomes a battery module that can be used to rebuild an assembled battery (reusable battery module). The storing of step S3 may be continued until rebuilding an assembled battery after the predetermined time elapses. Steps S1 to S3 may include a process for selecting defective rechargeable batteries.

Step S4 (Regeneration): Defective battery modules of an assembled battery are exchanged with reusable battery modules (e.g., reusable battery modules from other assembled batteries), which were stored in step S3 and are free from defects, or fresh battery modules to rebuild a regenerated assembled battery. A reusable battery module is obtained by undergoing full discharge and storage for a predetermined time or longer so as to reduce memory effect accumulation. As a result, a reusable battery module has battery characteristics similar to the battery characteristics obtained in a fresh state. Therefore, when combining a reusable battery module with battery modules of another assembled battery or with fresh battery modules to rebuild a regenerated assembled battery, the battery modules are in conformance with one another. This obtains a regenerated assembled battery having sufficient capacity.

Step S5: An assembled battery 10, which has been rebuilt in this manner, is charged so that the SOC is in an intermediate range (e.g., 60%) in correspondence with a fresh state in which it is installed in an electric vehicle, a hybrid vehicle, or the like. Then, the assembled battery 10 is returned to the user. By undergoing, steps S1 to S5, an assembled battery 10 having sufficient capacity may easily be rebuilt.

The advantages of the preferred embodiment will now be discussed.

(1) In the discharging step (step S2), the rechargeable batteries 20 of the assembled battery 10 are fully discharged in each of the battery modules 21 to 25. Then, in the storing step (step S3), the battery modules 21 to 25 are stored in a storage region for a predetermined time or longer from when there are fully discharged. In the regenerating step (step S4), a battery module subject to exchange (e.g., the battery module 21) is exchanged with a reusable battery module from another assembled battery that was stored in a fully discharged state (reusable battery module) or a fresh battery module to rebuild a regenerated assembled battery together with the other battery modules (e.g., the battery modules 22 to 25) of the assembled battery 10 that have been stored in the fully discharged state in the same manner. The memory effect accumulated in the rechargeable batteries 20 is reduced after a predetermined time elapses from when the battery modules 21 to 25 are fully discharged. Thus, by using only battery modules that have undergone steps S2 to S4 or by combining such battery modules with fresh battery modules to rebuild a regenerated assembled battery, the combined rechargeable batteries (battery modules) come into conformance with one another, and a regenerated assembled battery having sufficient capacity is easily rebuilt.

The assembled battery 10, which is used as a power source for an electric vehicle or a hybrid vehicle as in the preferred embodiment, repeats charging and discharging basically in an intermediate SOC range and is thus susceptible to memory effect accumulation. Therefore, the application of the present invention to the assembled battery 10 of the preferred embodiment is advantageous.

(2) In the discharging step (step S2), the discharging of the rechargeable batteries 20 subject to reuse is performed in each of the battery modules 21 to 25. This resets SOC variations between the battery modules 21 to 25 in each of the battery modules 21 to 25. Further, the charge and discharge voltages of each module are detected to inspect each module for defects. This allows for the selection of higher quality modules subject to reuse from the battery modules 21 to 25.

(3) In the regenerating step (step S4), any one of the battery modules 21 to 25 is wholly exchanged when including a defective rechargeable battery 20 subject to exchange. In this manner, whole battery units are exchanged to rebuild the assembled battery 10. This facilitates the rebuilding of the assembled battery 10.

(4) In the discharging step (step S2), the battery modules 21 to 25 (rechargeable batteries 20) subject to reuse are fully discharged. By detecting the discharge voltage during the discharge, the battery modules 21 to 25 may be inspect for defects. This allows for the selection of higher quality modules subject to reuse from the battery modules 21 to 25.

(5) In the storing step (step 33), when stored (left) for a predetermined time, the battery modules 21 to 25 subject to reuse may undergo battery voltage detection to inspect for defects. This allows for the selection of higher quality modules subject to reuse from the battery modules 21 to 25.

It should be apparent to those skilled in the art that the present invention may be embodied in many other specific forms without departing from the spirit or scope of the invention. Particularly, it should be understood that the present invention may be embodied in the following forms.

In the preferred embodiment, SOC values, storage time, storage temperature, and the like may be changed as required.

The present invention is not limited to collecting a used controller-equipped assembled battery and rebuilding a regenerated assembled battery. For example, the assembled battery main body 11 may be solely collected and a regenerated assembled battery main body may be solely rebuilt. Accordingly, in a non-limiting example, the controller-equipped assembled battery 10 or the assembled battery main body 11 is just an example of an assembled battery.

The assembled battery main body 11 is formed layout out the five battery modules 21 to 25 next to one another with each of the modules 21 to 25 including six rechargeable batteries 20 laid out in a single line. However, the layout of the rechargeable batteries forming the assembled battery main body 11 may be changed.

Instead of exchanging only defective rechargeable batteries (defective battery modules) with reused rechargeable batteries (reused battery modules), reused rechargeable batteries obtained from a plurality of assembled batteries may be combined to rebuild a new assembled battery. Further, reused rechargeable batteries may be mixed with fresh rechargeable batteries.

Instead of discharging and exchanging whole battery modules, whole cells (whole rechargeable batteries 20) may be discharged and exchanged. Alternatively, whole battery blocks, which are larger than battery modules, may be discharged and exchanged. Battery modules and battery blocks may be referred to as battery units.

The assembled battery 10 does not have to be used as a power source for an electric vehicle or a hybrid vehicle and may be used as a power source for other machines such as a portable device.

The present examples and embodiments are to be considered as illustrative and not restrictive, and the invention is not to be limited to the details given herein, but may be modified within the scope and equivalence of the appended claims.

What is claimed is:

1. A rechargeable battery exchanging method, comprising:
   discharging a nickel metal hydride (NiMH) rechargeable battery derived from a vehicle assembled battery used as a power source for a vehicle until the nickel metal hydride rechargeable battery reaches a fully discharged state;
   preventing the nickel metal hydride rechargeable battery in which memory effect accumulation is not reduced from being used for rebuilding a regenerated vehicle assembled battery by storing the nickel metal hydride rechargeable battery that is in the fully discharged state in a storage region for three hours or longer from when the nickel metal hydride rechargeable battery reaches the fully discharged state to prepare a reusable nickel metal hydride rechargeable battery in which memory effect accumulation is reduced; and
   rebuilding a regenerated vehicle assembled battery to be used as a power source for a vehicle by combining the stored reusable nickel metal hydride rechargeable battery derived from the vehicle assembled battery with a stored reusable nickel metal hydride rechargeable battery derived from other assembled batteries or combining the stored reusable nickel metal hydride rechargeable battery derived from the vehicle assembled battery with a fresh nickel metal hydride rechargeable battery.

2. The method according to claim 1, wherein said discharging includes discharging only the rechargeable battery or discharging a whole battery unit formed by less rechargeable batteries than the assembled battery.

3. The method according to claim 1, wherein said rebuilding includes combining the rechargeable batteries by combining whole battery units, each formed by less rechargeable batteries than the assembled battery and including the reusable rechargeable battery.

4. The method according to claim 1, further comprising: inspecting the rechargeable battery for a defect based on discharge voltage of the rechargeable battery detected during a period of discharging the rechargeable battery to the fully discharged state.

5. The method according to claim 1, further comprising: inspecting the rechargeable battery for a defect based on battery voltage of the rechargeable battery detected during a period of storing the rechargeable battery in the stored region.

6. The method according to claim 1, wherein the assembled battery is an electric vehicle power source or a hybrid vehicle power source.

7. A method of rebuilding a regenerated assembled battery, the method comprising:
   collecting used vehicle assembled batteries used as a power source for a vehicle;
   discharging nickel metal hydride rechargeable batteries forming the collected assembled batteries to a fully discharged state;
   preventing the nickel metal hydride rechargeable batteries in which memory effect accumulation is not reduced from being used for rebuilding a regenerated vehicle assembled battery by storing the nickel metal hydride rechargeable batteries that are in the fully discharged state in a storage region for three hours or longer from when the nickel metal hydride rechargeable batteries reach the fully discharged state to prepare reusable rechargeable batteries in which memory effect accumulation is reduced; and rebuilding a regenerated vehicle assembled battery to be used as a power source for a vehicle by combining the stored reusable nickel metal hydride rechargeable batteries or combining at least one of the stored reusable nickel metal hydride rechargeable batteries with a fresh nickel metal hydride rechargeable battery.

* * * * *